United States Patent [19]

Nakagaki et al.

[11] Patent Number: 5,181,116
[45] Date of Patent: Jan. 19, 1993

[54] TELEVISION RECEIVER WITH CONTROL OF WRITING AND READING OF VIDEO MEMORY

[75] Inventors: Nobufumi Nakagaki, Tokyo; Toshiyuki Kurita, Yokohama; Toshinori Murata, Yokohama; Kazuhiro Kaizaki, Yokohama; Sadao Kubota, Yokohama; Masanori Kamiya, Yokohama; Hiroshi Sekiya, Yokohama; Kenichi Fujiwara, Yokohama, all of Japan

[73] Assignees: Hitachi, Ltd., Tokyo; Hitachi Video Engineering, Inc., Yokohama, both of Japan

[21] Appl. No.: 489,509

[22] Filed: Mar. 7, 1990

[30] Foreign Application Priority Data

Mar. 10, 1989 [JP] Japan .................................. 1-56463

[51] Int. Cl.$^5$ .............................................. H04N 5/04
[52] U.S. Cl. ...................................... 358/159; 358/148
[58] Field of Search ....................... 358/148, 158, 159

[56] References Cited

U.S. PATENT DOCUMENTS

| | | | |
|---|---|---|---|
| 4,134,082 | 1/1979 | Fernster | 358/159 |
| 4,591,910 | 5/1986 | Lai et al. | 358/148 |
| 4,769,705 | 9/1988 | Lendaro | 358/159 |
| 4,870,490 | 9/1989 | Sekiya et al. | 358/158 |
| 5,043,813 | 8/1991 | Christopher | 358/148 |

Primary Examiner—Victor R. Kostak
Assistant Examiner—Jeffrey S. Murrell
Attorney, Agent, or Firm—Antonelli, Terry, Stout & Kraus

[57] ABSTRACT

In a television receiver in which scanning for an incoming video signal is performed at a frequency n times as high as the input horizontal synchronous frequency by suitably controlling writing and reading on its video memory, the signals for writing and reading on the video memory unit are generated by a horizontal synchronization/deflection circuit. The horizontal synchronization/deflection circuit is arranged by having a clock generation/synchronous deflection circuit for generating reference signals to control the writing and reading on the video memory unit provided with a phase comparator such that a horizontal drive signal to drive a horizontal deflection circuit and a flyback pulse are brought in phase.

22 Claims, 16 Drawing Sheets

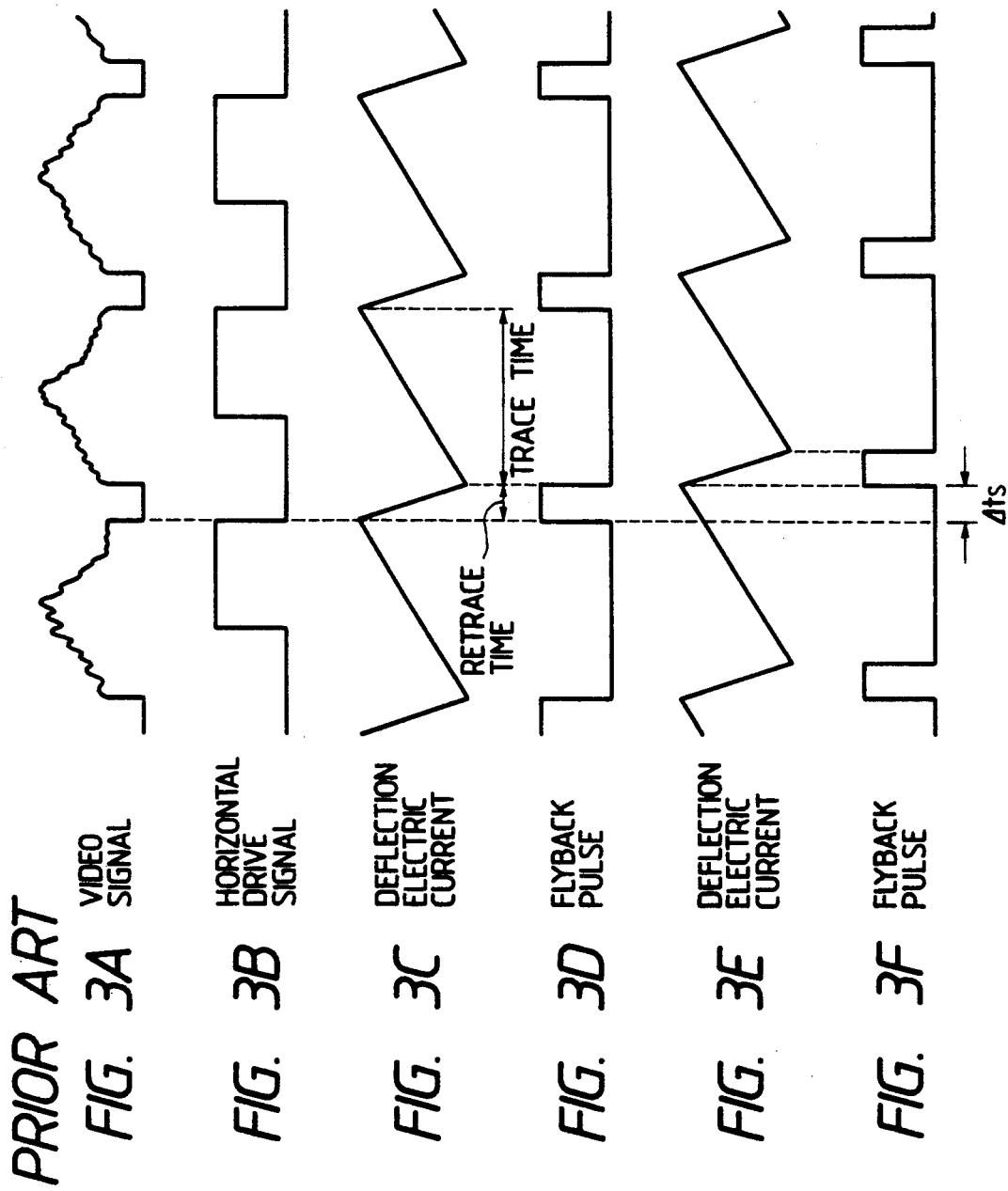

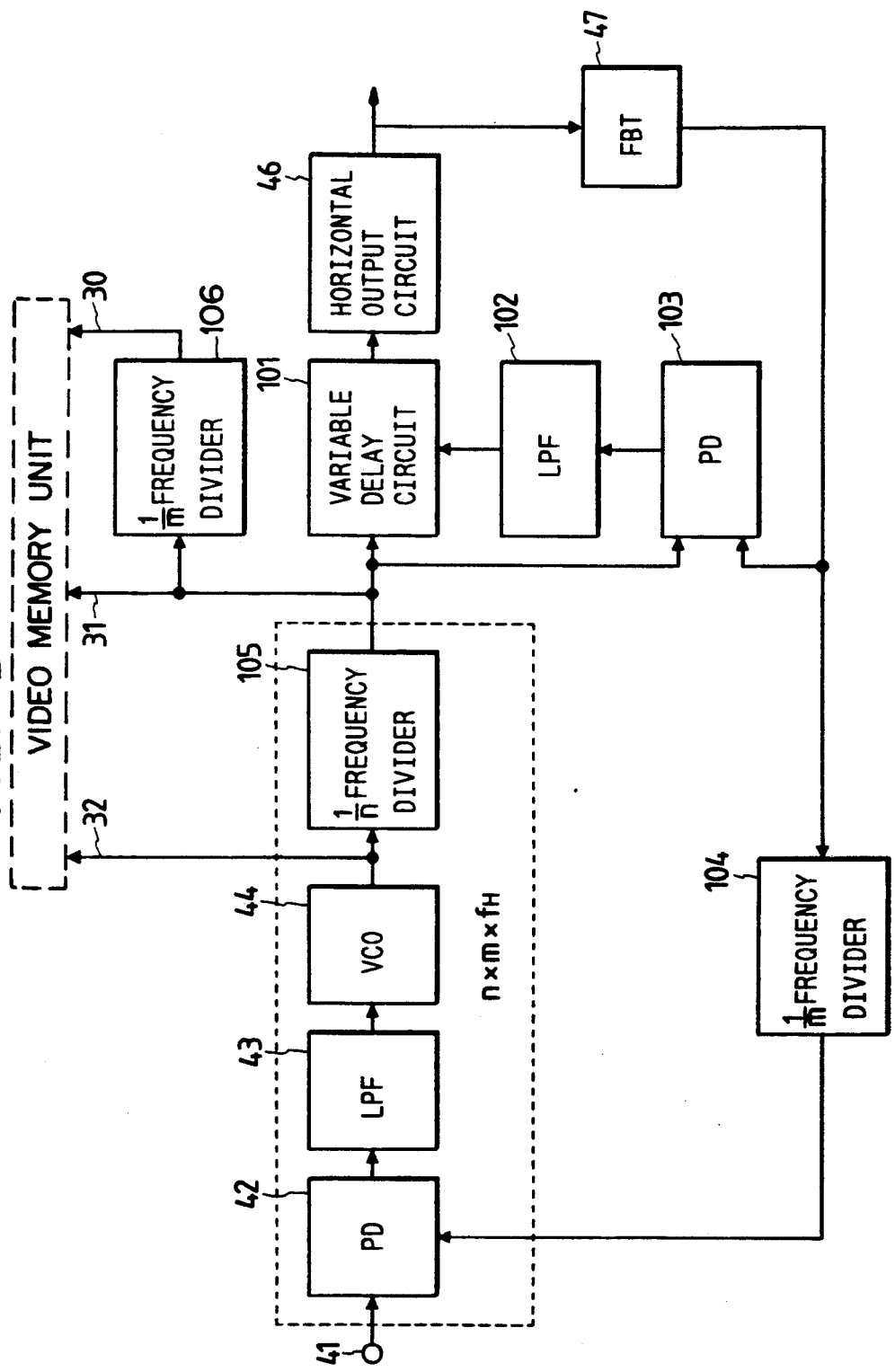

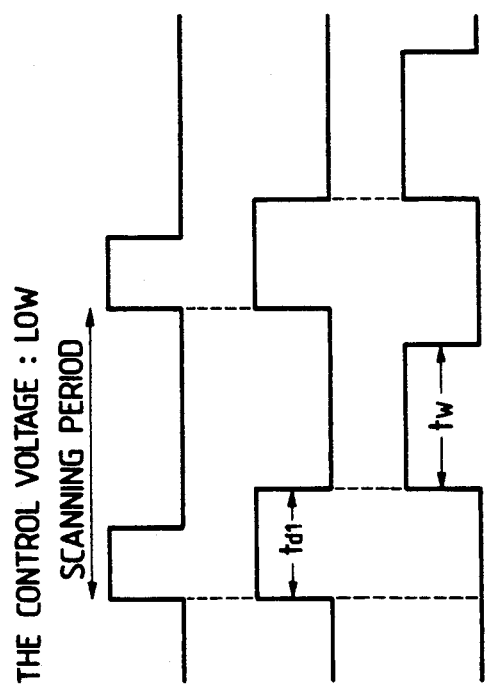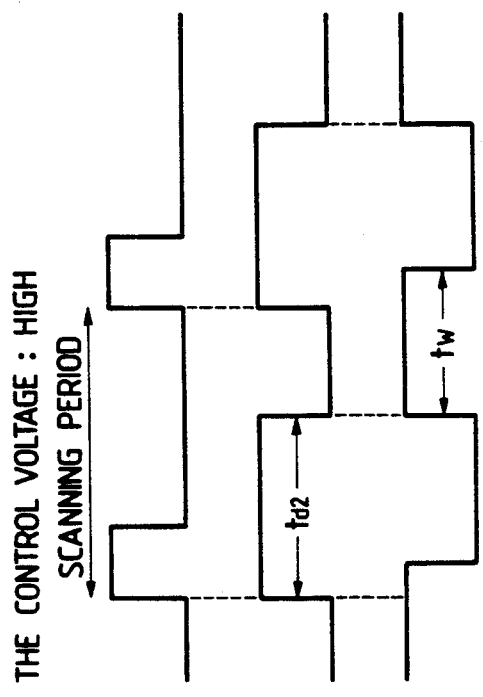

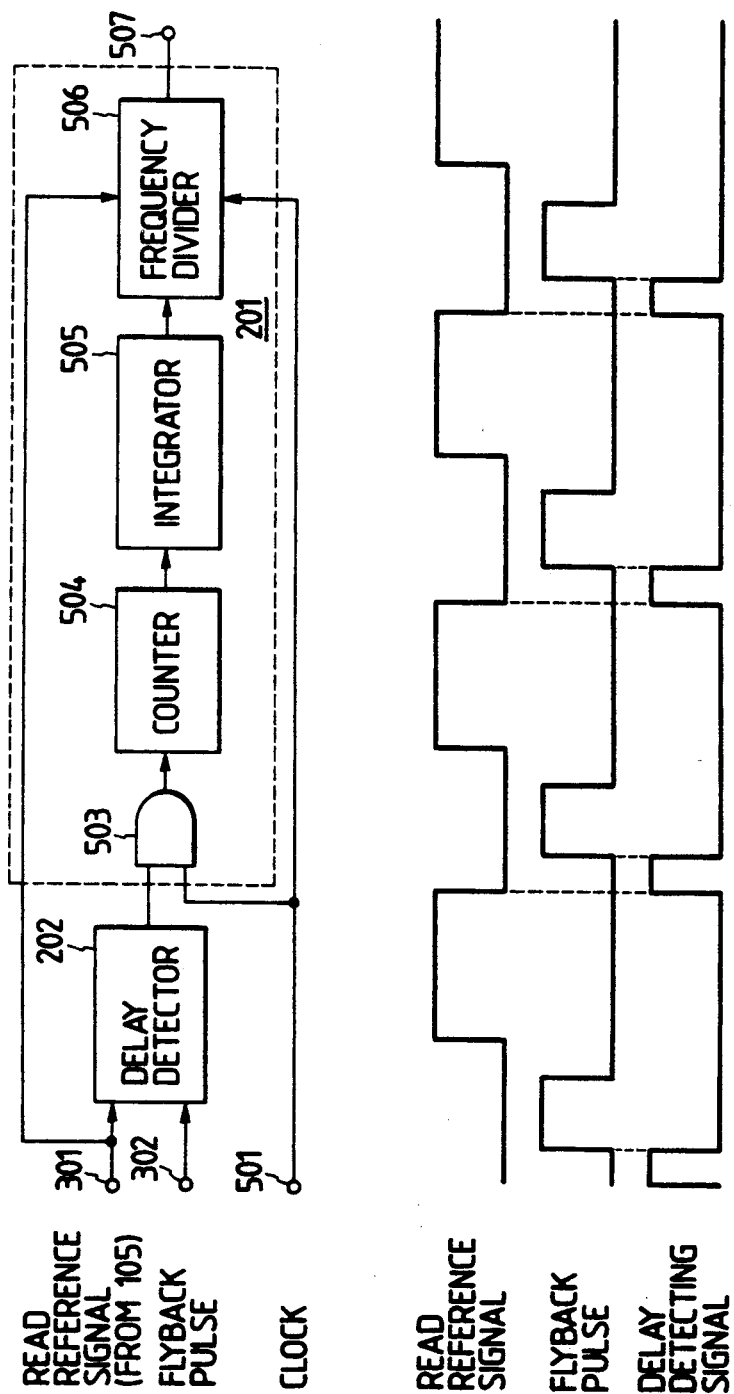

TELEVISION RECEIVER WITH CONTROL OF WRITING AND READING OF VIDEO MEMORY

BACKGROUND OF THE INVENTION

1. Field of the Invention

The present invention relates to a television receiver in which a video signal is digitally processed and scanned at the frequency n times as high as that of the horizontal sync and, more particularly, to a synchronous deflection circuit generating the system clock and reference signals synchronized with the input horizontal sync signal.

2. Description of the Prior Art

Television receivers are being actively developed these days and there is an IDTV (Improved Definition TV) on the market in which a digital circuit is used in its video circuit in place of an analog circuit hitherto used for signal processing. With the aim to process the existing television signal into a picture of a higher quality, various types of signal processing techniques achieving a high quality picture are being studied and some are put into practice.

The signal processing techniques to achieve a high quality picture includes:

(1) Three-dimensional Y/C separation using a frame memory unit and a noise reducer.

(2) Multiple speed conversion to convert an interlace signal into a noninterlace signal.

(3) Vertical contour correction using a line memory unit.

Since such signal processing is required to be performed in a digital circuit with high accuracy, the provision of stabilized synchronous reproduction and a stable system clock becomes indispensable. As an example of such techniques, there is one disclosed in Ser. No. 248,375 (filed on Sep. 23, 1988), now U.S. Pat. No. 4,870,490 principle of the art will be briefly described below.

FIG. 1 is a block diagram showing a structure of a prior art television receiver, in which reference numeral 11 denotes an input terminal, 12 denotes a line comb filter, 13, 14, and 15 denote A/D converters, 16 denotes a color demodulation circuit, 17 and 18 denote frame comb filters, 19 and 20 denote multiple speed conversion circuits, 21, 22, and 23 denote D/A converters, 24 denotes a matrix video output circuit, 25 denotes a cathode ray tube, 26 denotes a sync separation circuit, 27 denotes a clock generation/synchronous deflection circuit, 28 denotes a digital signal processor, 30 denotes a write reference signal, 31 denotes a read reference signal, and 32 denotes a system clock.

Operations will be described below. A composite video signal input through the input terminal 11 is separated into a luminance signal (Y) and a chrominance signal (C) by the line comb filter 12. The separated chrominance signal (C) by the line comb filter 12 is separated into two color difference signals (R−Y, B−Y) by a color demodulation circuit 16. The thus obtained luminance signal (Y) and color difference signals (R−Y, B−Y) are delivered to the digital signal processor 28.

In the digital signal processor 28, the incoming luminance signal (Y) and color difference signals (R−Y, B−Y) are respectively converted into digital signals by the A/D converters 13, 14, and 15. The luminance signal (Y) converted to the digital signal is deprived of residual color signal and noise components by the frame comb filter 17. Then, the luminance signal (Y) is subjected to a multiple speed conversion in the multiple speed conversion circuit 19, whereby the signal, which has been of interlaced scanning lines, is given new scanning lines by interpolation put in between the original scanning lines. The luminance signal (Y) undergone the multiple speed converted is recovered to an analog signal by the D/A converter 21. On the other hand, the color difference signals (R−Y, B−Y) converted to digital signals, similar to the luminance signal (Y), are also deprived of residual luminance signal and noise components by the frame comb filter 18. Then, these signals, which have been of interlaced scanning lines, are given interpolating scanning lines put in between their original scanning lines, and thereby, these signals are converted to those with the multiple speed. Such color difference signals (R−Y, B−Y) converted so as to have the multiple speed are respectively recovered to analog signals by the D/A converters 22 and 23.

The thus obtained luminance signal (Y) and color difference signals (R−Y, B−Y) with the multiple speed are converted into RGB signals by the matrix video output circuit 24 and amplified with a predetermined gain and supplied to the cathode ray tube 25 as high quality video.

The composite video signal input through the input terminal 11 is also supplied to the sync separation circuit 26 and a horizontal sync signal and a vertical sync signal are separated therefrom. The horizontal sync signal of the separated sync signals is supplied to the clock generation/synchronous deflection circuit 27. The clock generation/synchronous deflection circuit 27 performs outputting of a system clock 32 (1820 $f_H$), the write reference signal 30 ($f_H$) for writing signals into the memory, and the read reference signal 31 (2 $f_H$) for multi-speed conversion as well as deflection of the electron beam in the horizontal direction.

A prior art example of the clock generation/synchronous deflection circuit 27 will be described below with reference to FIG. 2. Referring to the figure, reference numeral 41 denotes an input terminal, 42 denotes a phase comparator (PD), 43 denotes a low-pass filter (LPF), 4 denotes a voltage-controlled oscillator (VCO), 45 denotes a 1/910 frequency divider, 46 denotes a horizontal output circuit, 47 denotes a flyback transformer (FBT), and 48 and 49 denote ½ frequency dividers.

The horizontal sync signal input through the input terminal 41 is supplied to the phase comparator (PD) 42 and therein it is compared with the other input and the result corresponding to the phase difference is output. The output of the phase comparator is filtered in the low-pass filter (LPF) 43 so as to be given a predetermined response characteristic and supplied to the voltage-controlled oscillator (VCO) 44. The voltage-controlled oscillator (VCO) 44 functions to vary its oscillating frequency (here, around 1820 $f_H$) corresponding to the incoming voltage as the result of the phase comparison. The output oscillated thereby becomes the system clock 32 and it is supplied to both the digital signal processor and the 1/910 frequency divider 45.

The 1/910 frequency divider 45 divides the frequency of the incoming clock, thereby generating the reference signal necessary for the digital signal processor and the like. The read reference signal 31 is obtained by the frequency division of the system clock 32 in the 1/910 frequency divider 45, and by the frequency division of this signal in the ½ frequency divider 49 is obtained the write reference signal 30. The read reference signal undergone the 1/910 frequency division is further supplied to the horizontal output circuit 46 as the horizontal drive signal for the horizontal deflection system. The horizontal output circuit 46 amplifies the horizontal drive signal undergone the 1/910 frequency division and drives the horizontal deflection yoke as shown in FIG. 1 with the signal, thereby performing the horizontal scanning. At the same time, the voltage of the signal for driving the deflection yoke is stepped up by the flyback transformer (FBT) 47 so as to be used as high-voltage power sources. A flyback pulse generated on the secondary side of the flyback transformer is subjected to ½ frequency division in the ½ frequency divider 48 and supplied as a horizontal sync signal to the phase comparator (PD) 42.

Thus, the phase comparator (PD) 42 makes comparison of the phase of the horizontal sync signal input through the input terminal 41 with the phase of the flyback pulse generated in the horizontal deflection system and undergone the ½ frequency division. As a result, the horizontal deflection system shown in FIG. 2 performs feedback control so that the input signal and the horizontal deflection signal are kept in phase at all times.

In the above described prior art, no consideration has been made of the storage time ($t_s$) in the horizontal output transistor of the horizontal output circuit 46 and surrounding transistors and, hence, there has been a problem that the horizontal center of the picture deviates as the temperature changes. This problem will be described below with reference to FIG. 3A to FIG. 3F.

FIG. 3A to FIG. 3F are waveform charts of signals in various points in the FIG. 1 and FIG. 2. When a video signal shown in FIG. 3A is output from the matrix video output circuit 24 and, at the same time, the horizontal drive signal shown in FIG. 3B is output from the 1/910 frequency divider 45, the horizontal output circuit 46 supplies the deflection current as shown in FIG. 3C to the horizontal deflection yoke, whereby scanning is performed. The flyback pulse then generated is in the position virtually corresponding to the retrace time as shown in FIG. 3D.

In bipolar transistors, generally, when they are used for switching and turned from ON to OFF, there is present a storage time ($t_s$) causing a delay in the switching. The storage time tends to increase as the temperature rises. Therefore, when temperature rises, the deflection current and the flyback pulse are delayed by $\Delta t_s$ as shown in FIG. 3E and FIG. 3F, and as a result, the horizontal center of the picture is deviated. The situation at this time is shown in FIG. 4A and FIG. 4B. FIG. 4A shows a picture before the deviation occurs and FIG. 4B shows a picture after the deviation has occurred. As apparent from the figures, a picture image which has been observed up to that time goes off the screen as the horizontal center deviates with the lapse of time and increase in temperature.

SUMMARY OF THE INVENTION

An object of the present invention is to provide, in television receivers in which scanning for an incoming video signal is performed at a frequency n times as high as the input horizontal synchronous frequency by suitably controlling writing and reading on its video memory, a television receiver adapted to be free from deviation of the horizontal center of the picture even if a storage time ($t_s$) is produced due to a change in temperature of the horizontal output transistor in the horizontal output circuit and surrounding transistors.

To achieve the above mentioned object, the present invention includes a horizontal synchronization/deflection circuit for generating signals controlling the writing and reading on its video memory which comprises a means receiving a horizontal sync signal for outputting a signal with a frequency n times as high as the frequency of the horizontal sync signal, a horizontal output circuit receiving the signal with the n-fold frequency for driving the horizontal deflection yoke to perform horizontal scanning, a flyback transformer for amplifying the signal with the n-fold frequency, and a control means for bringing the phases of the output of the horizontal output circuit and the signal for controlling reading in phase.

BRIEF DESCRIPTION OF THE DRAWINGS

FIGS. 3A, 3B, 3C, 3D, 3E, and 3F are waveform charts for explaining a prior art example;

FIG. 5 is a block diagram showing a circuit configuration of a first embodiment of the present invention;

FIGS. 7A, 7B, 7C, 8A, 8B, and 8C are waveform charts for explaining operations of a circuit for performing variable delaying according to the present invention;

FIG. 13 is a block diagram showing a specific example of a circuit for performing variable delaying in the third embodiment; and FIGS. 14A-14C are a waveform chart for explaining operations of a delay detector in FIG. 13;

DESCRIPTION OF THE PREFERRED EMBODIMENTS

A first embodiment of the present invention will be described below with reference to FIG. 5.

Figure 2:
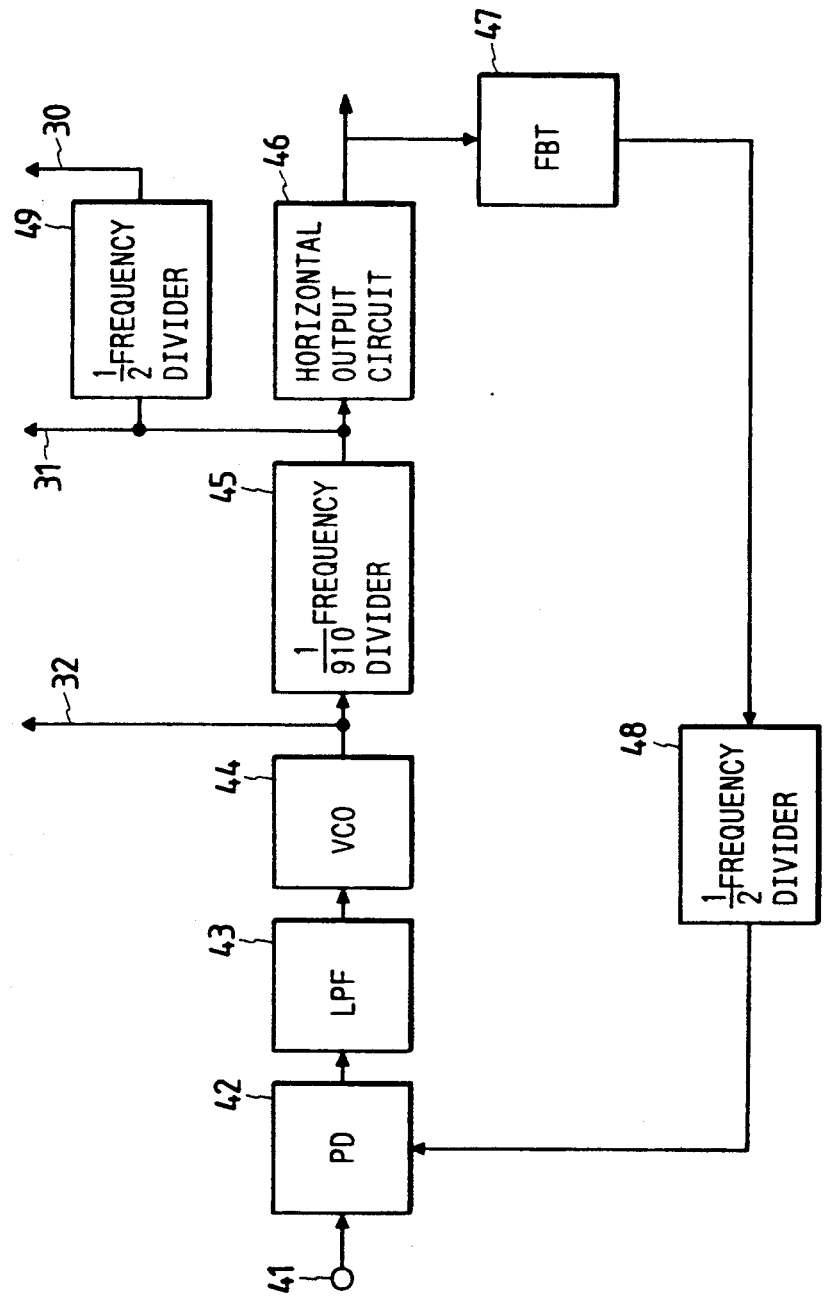
FIG. 2 is a block diagram showing a structure of a prior art clock generation/synchronous deflection circuit.
Figure 4A:
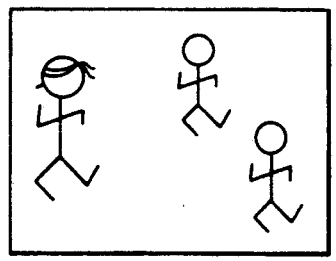
FIGS. 4A and 4B are diagrams of picture image on a television receiver for explaining a prior art example.
Figure 4B:
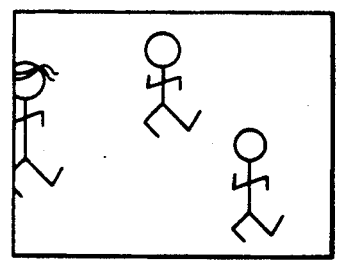

FIG. 5 shows a horizontal synchronization/deflection circuit of the present invention, in which reference numeral 101 denotes a variable delay circuit, 102 denotes a low-pass filter (LPF), 103 denotes a phase comparator (PU), 104 and 106 denote 1/m frequency dividers, 105 denotes a 1/n frequency divider, and like reference numerals to those in FIG. 2 denote corresponding parts.

Operations of the circuit will be described below. The corresponding parts to those in FIG. 2 performs the same operations and, hence, description of them will be omitted.

The voltage-controlled oscillator (VCO) 44 oscillates at the frequency n×m times as high as the input horizontal synchronous frequency $f_H$ and its output, the system clock 32, is supplied to the digital signal processor 28 and also supplied to the 1/n frequency divider 105. The 1/n frequency divider 105 divides the system clock by n so that the frequency necessary for m-fold speed conversion is obtained. The signal whose frequency is divided by n is output as the horizontal drive signal and the read reference signal 31, and the horizontal drive signal is supplied to the variable delay circuit 101. On the other hand, the read reference signal supplied to the 1/m frequency divider 106 is divided by m and turned into the reference write signal 30 and supplied to the digital signal processor. The variable delay circuit 101 controls the delay time of the incoming horizontal drive signal, with its frequency divided by n, and supplies the signal to the horizontal output circuit 46.

Thereafter, the phases of the flyback pulse output from the flyback transformer (FBT) 47 and the horizontal drive signal with its frequency divided by n are compared with each other by the phase comparator 103, and the result of the phase comparison is deprived of signals of unwanted bands by the low-pass filter 102 and supplied to the control terminal of the variable delay circuit 101. Thus, the variable delay circuit 101 is enabled to perform control of the horizontal drive signal with its frequency divided by n. By virtue of the negative feedback executed in the described manner, the read reference signal 31 and the horizontal deflected position are kept concurrent at all times even if the storage time ($t_s$) of the horizontal output transistor varies with temperature, thus causing no deviation of the horizontal center. Here, what is restored by the application of negative feedback is the temperature variation of the storage time ($t_s$). This temperature variation of the storage time of the horizontal output transistor varies, in fact, very slowly and, hence, it is made possible to stabilize the circuit operation by narrowing the passband of the low-pass filter (LPF) 102.

Since the flyback pulse output from the flyback transformer (FBT) 47 has m-times as high frequency as the input horizontal synchronous frequency $f_H$, its frequency is divided by m by the 1/m frequency divider 104, whereby it is converted to a signal with the same frequency as the horizontal synchronous frequency $f_H$, and this signal is supplied to the phase comparator 42.

In the described manner, even if the delay time due to the storage time ($t_s$) of the horizontal output transistor varies with the temperature, an image free of deviation of the horizontal center can be obtained.

Now a specific example of the variable delay circuit 101, low-pass filter 102, and phase comparator 103 constituting the circuit for performing the variable delaying in the first embodiment will be described.

Figure 1:
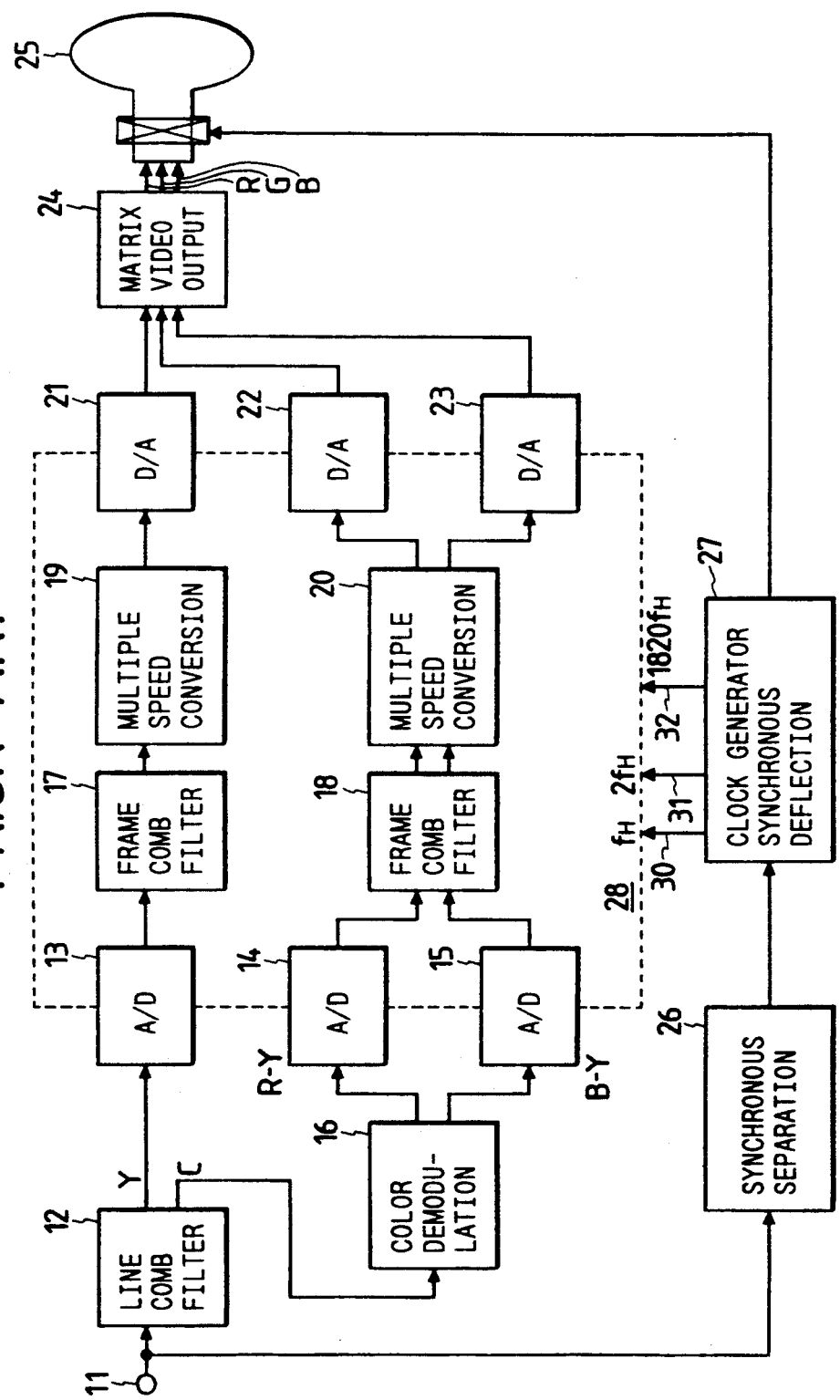
FIG. 1 is a block diagram showing a structure of a prior art television receiver.
Figure 6:
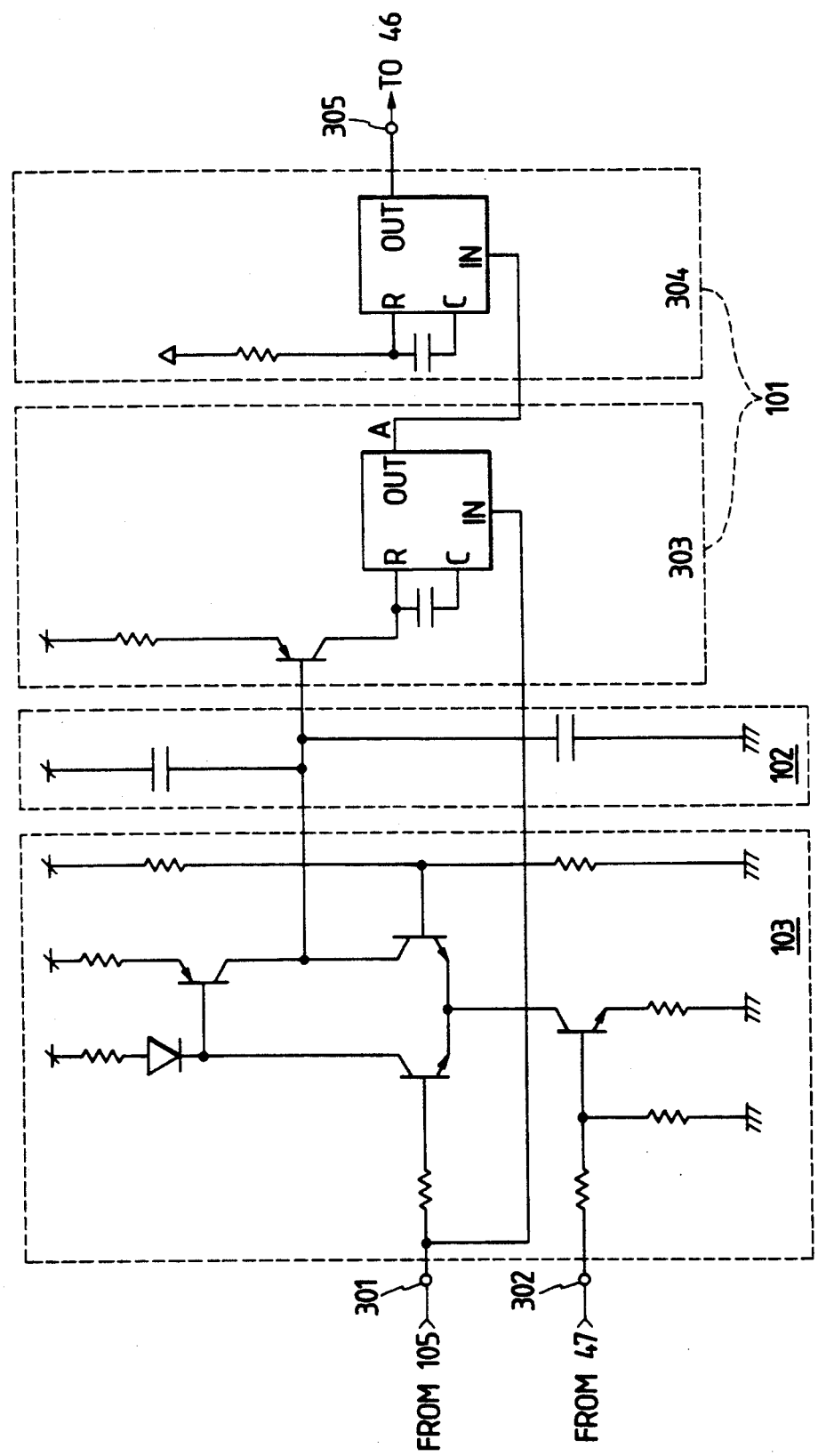
FIG. 6 is a circuit diagram showing a first specific example of a circuit performing variable delaying according to the present invention.

FIG. 6 is a circuit diagram showing a first example of the specific example, in which reference numeral 301 denotes a read reference signal input terminal, 302 denotes a flyback pulse input terminal, 303 denotes a pulse width varying circuit for controlling the delay time in the variable delay circuit 101, 304 denotes a waveform shaping circuit for keeping constant the pulse width of the delivered horizontal output pulse, and 305 denotes an output terminal, and like reference numerals to those in FIG. 1 denote corresponding parts.

Operations of the circuit will be described below.

The phase comparator 103 is made operative when the flyback pulse input to the flyback pulse input terminal 302 is High and nonoperative when the flyback pulse is Low. When the flyback pulse is High, and if, then, the read reference signal input to the read reference signal input terminal 301 is High, it supplies a current as its output, and if the read reference signal is Low, it drains a current as its output. The supplied currents and the drained currents are integrated by the low-pass filter 102. The integrated output therefrom is supplied as a D.C. voltage to the pulse width varying circuit 303. The pulse width varying circuit 303 is constituted of a variable current source and a monostable multivibrator, wherein it is adapted such that the pulse width in the monostable multivibrator becomes narrower with increase in the current of the variable current source and its pulse width becomes wider with decrease in the current. The variable current source is controlled according to the D.C. voltage as the output of the low-pass filter 102 and the operation of the monostable multivibrator is started according to the read reference signal. Thus, the pulse width of the pulse width varying circuit 303 can be controlled in accordance with the result of comparison as the output of the phase comparator 103. Then, the waveform shaping circuit 304 generates a signal whose pulse width is constant from the signal with the controlled pulse width, whereby a pulse of which the pulse width is constant and the delay time is varied is obtained at the output terminal.

Behavior of the circuit will be described below with reference to FIGS. 7A, 7B, 7C, 8A, 8B, and 8C, FIGS. 7A, 7B, and 7C are diagrams showing the behavior when the control voltage for the pulse width varying circuit 303 is low. As shown in the diagrams, a signal A with a pulse width $td_1$ (FIG. 7B) rising at the leading edge of the read reference signal (FIG. 7A) is obtained. This pulse is supplied to the waveform shaping circuit 304, and a signal with a pulse width tw (FIG. 7C) rising at the trailing edge of the signal A is delivered to the output terminal 305. The case where the control voltage for the pulse width varying circuit 303 is high is shown in FIGS. 8A, 8B, and 8C. As shown in the diagrams, a signal A with a pulse width $td_2$ is obtained as the output of the pulse width varying circuit 303 (FIG. 8B).

Thus, an output of which the delay time is short is obtained when the control voltage is low and that of which the delay time is long is obtained when the control voltage is high.

Figure 9:
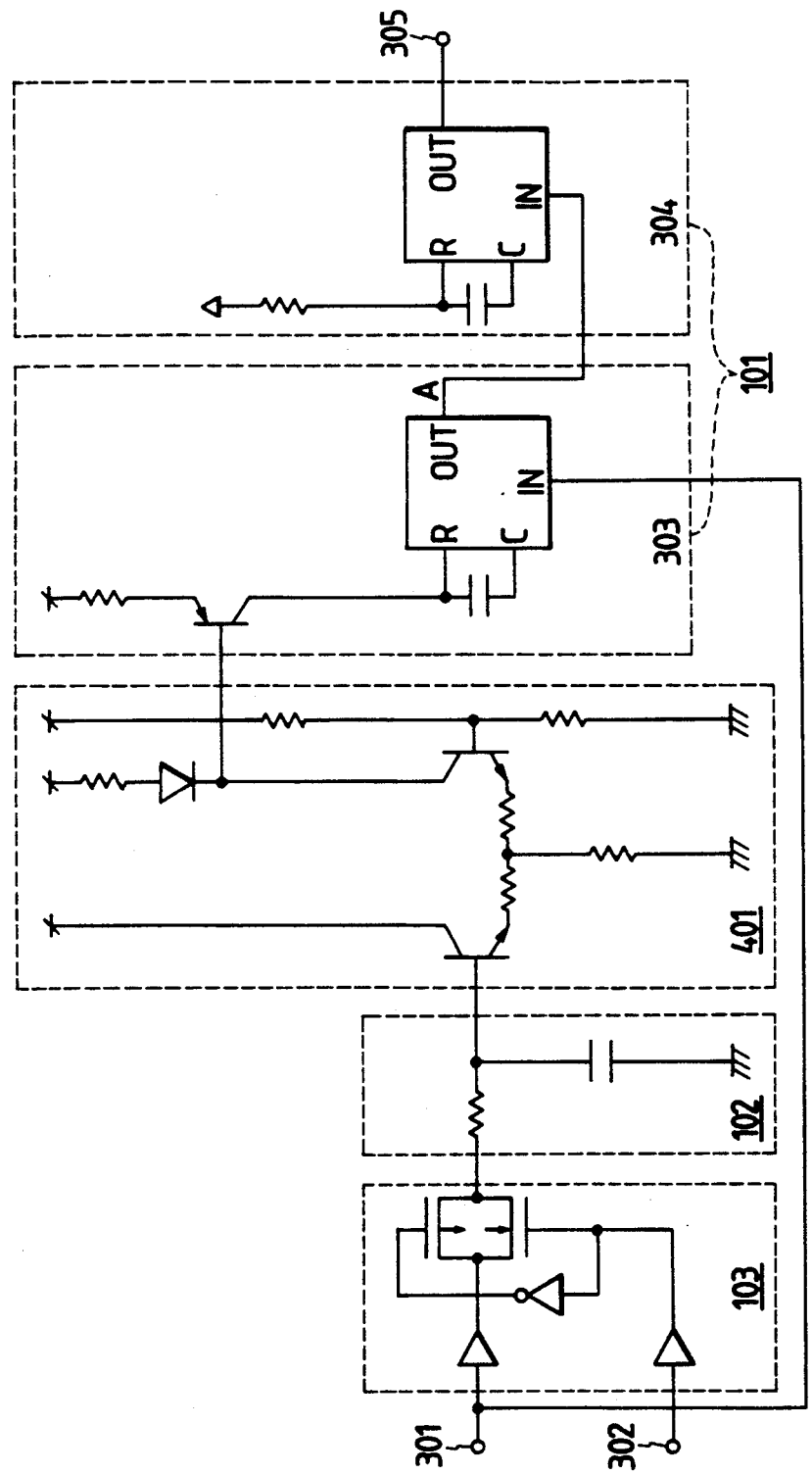
FIG. 9 is a circuit diagram showing a second specific example of a circuit performing variable delaying according to the present invention.

Now, a second specific example of the circuit performing the variable delaying in the first embodiment will be described with reference to FIG. 9. In FIG. 9, reference numeral 401 denotes a voltage amplifier and like reference numerals to those in FIG. 6 denote corresponding parts.

The phase comparator 103 is constituted of a CMOS switch and delivers its output in a voltage mode, while its counterpart in FIG. 6 delivered its output in a current mode. The low-pass filter 102 being of a CR type is not different in its performance. The voltage amplifier 401 is for obtaining a loop gain necessary for the control system. The circuits in the subsequent stages are the same as those in FIG. 6 and, hence, explanation thereof will be omitted.

The second specific example uses a CMOS switch in the phase comparator 103 and, hence, it is characterized by that its switch has a very high impedance and allows virtually no leak current to flow when it does not make the phase comparison.

Figure 10:
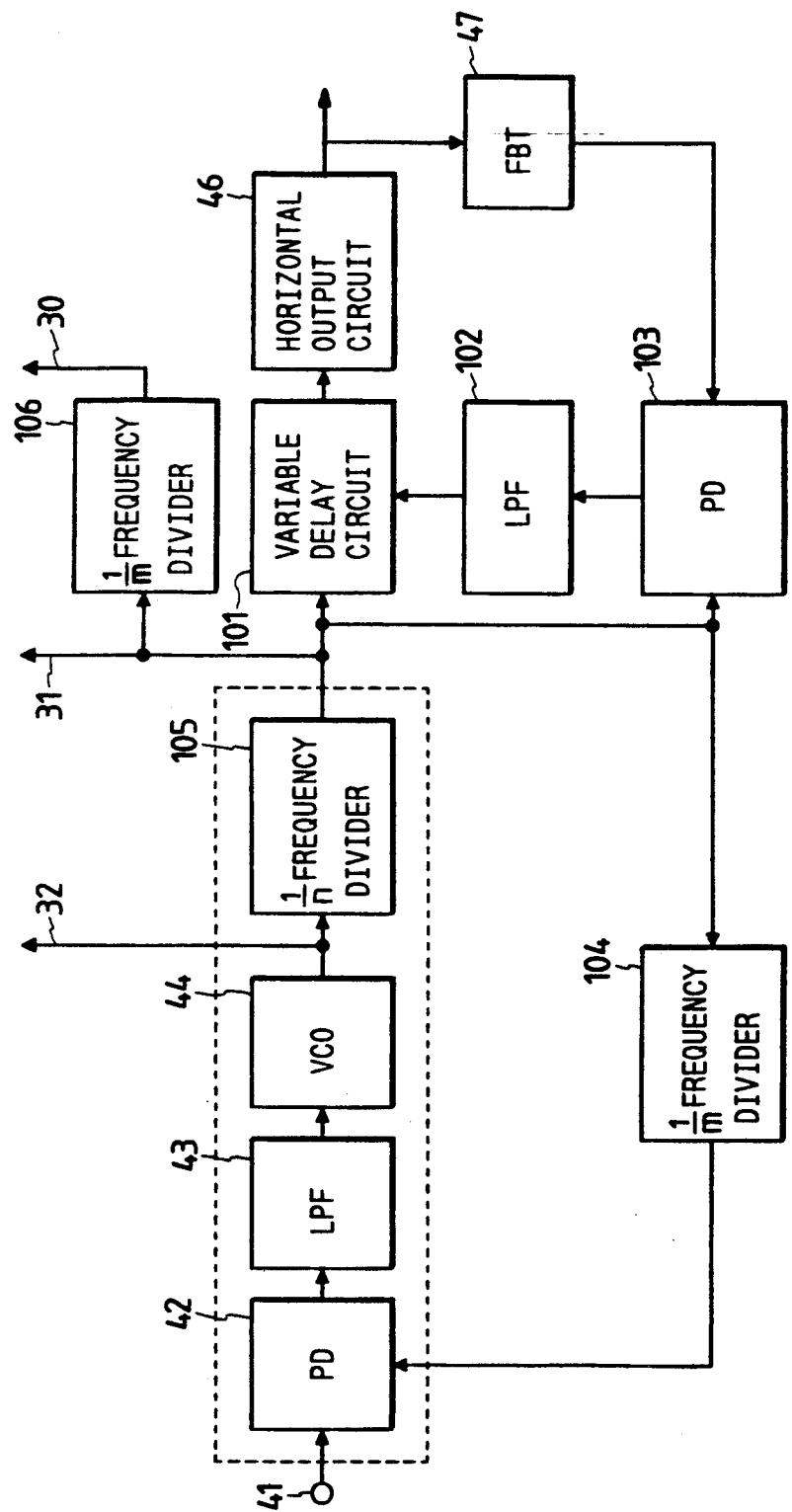
FIG. 10 is a block diagram showing a circuit configuration of a second embodiment of the present invention.

A second embodiment of the present invention will be described below with reference to FIG. 10. Referring to FIG. 10, parts constituting the circuit are all the same as those shown in FIG. 5.

While the input of the 1/m frequency divider 104 in the first embodiment was the flyback pulse output from the flyback transformer (FBT) 47 in FIG. 5, the input to the 1/m frequency divider 104 in the present embodiment is changed to the horizontal drive signal output of the 1/n frequency divider 105. The operations and effects of the circuit are the same as those in the first embodiment, but, in the present embodiment, the first control system constituted of the phase comparator (PD) 42, low-pass filter (LPF) 43, voltage-controlled oscillator (VCO) 44, 1/n frequency divider 105, and the 1/m frequency divider 104 is arranged independently of the second control system constituted of the variable delay circuit 101, horizontal output circuit 46, flyback transformer (FBT) 47, phase comparator 103, and the low-pass filter (LPF) 102. Hence, by arranging the first control system in the vicinity of the digital signal processor and arranging the second control system in the vicinity of the deflection circuit, such an effect is obtained that a system hardly affected by external disturbance can be structured.

Specific examples of the variable delay circuit 101, the low-pass filter 102, and the phase comparator 103 are the same as those of the first embodiment.

Now, a third embodiment of the present invention will be described with reference to FIG. 11. In the figure, reference numeral 201 denotes a variable delay circuit and 202 denotes a delay detector. Like reference numerals to those in FIG. 5 denote corresponding parts.

The corresponding portions of the circuit to those in FIG. 5 perform the same operations and, hence, explanation thereof will be omitted.

The delay detector 202 detects the difference between the delay time of the horizontal drive signal output from the 1/n frequency divider 105 and that of the flyback pulse output from the flyback transformer (FBT) 47 and outputs the difference as a delay amount signal to the variable delay circuit 201. The variable delay circuit 201 delays the read reference signal 31 by a period of time corresponding to the delay signal and delivers the signal. As a result, the write reference signal 30 as the output of the 1/m frequency divider 106 is also delayed by the same delay amount as the read reference signal 31.

Figure 11:
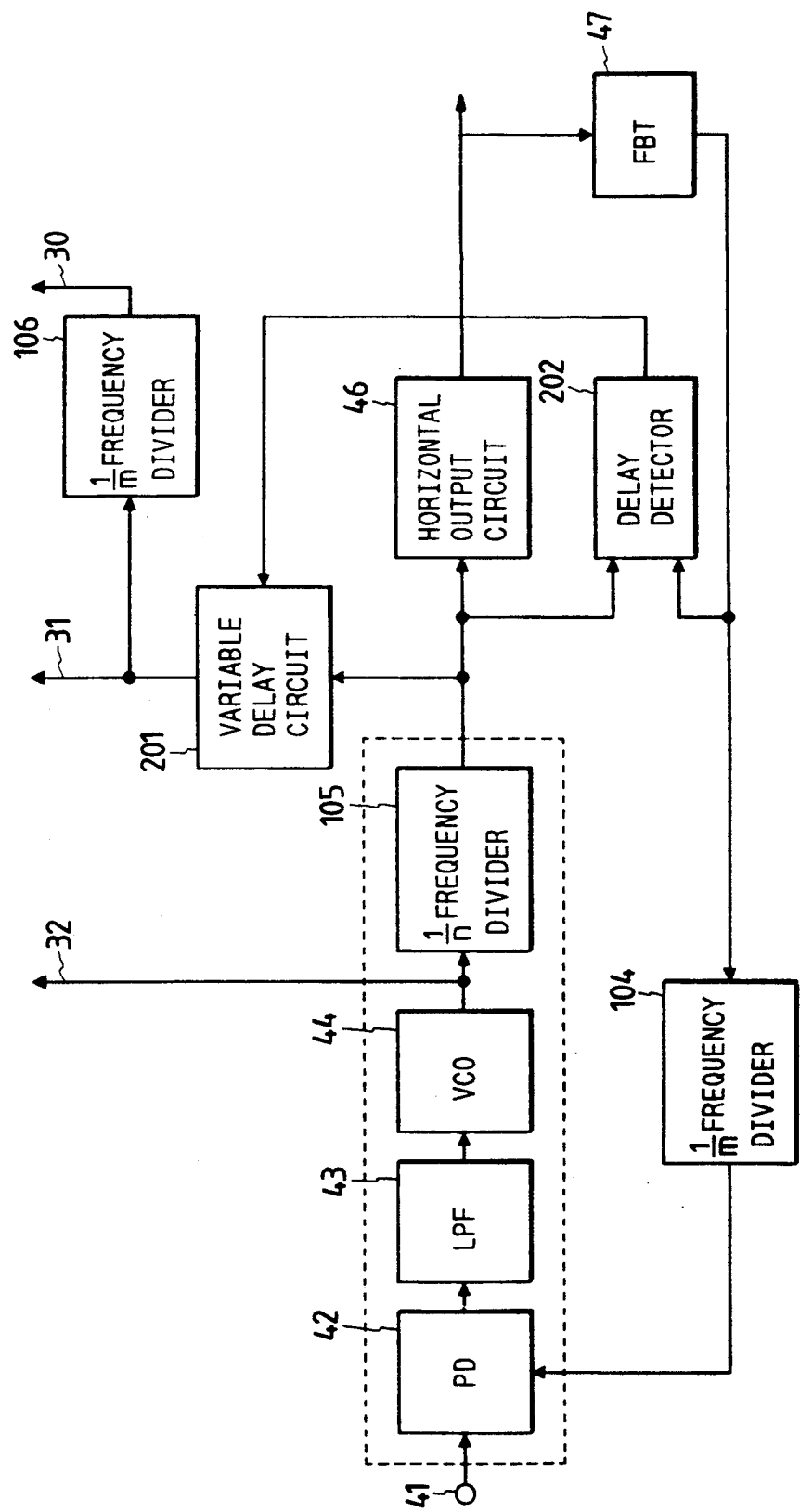
FIG. 11 is a block diagram showing a circuit configuration of a third embodiment of the present invention.
Figure 12A:
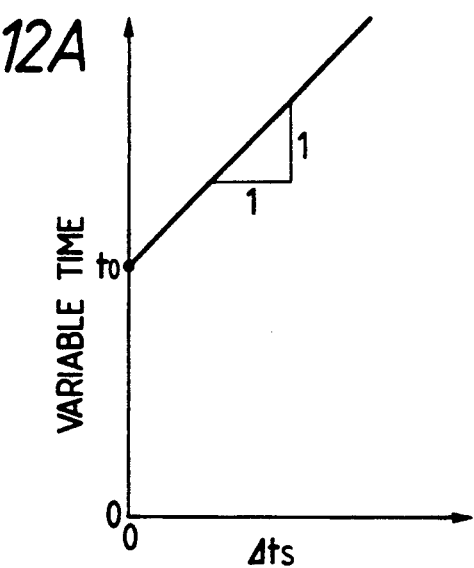
FIGS. 12A, 12B, and 12C are characteristics showing relationships between difference in delay time $\Delta t_s$ and variable time.

The delay control of the write and read reference signals by the delay detector 202 and the variable delay circuit 201 in FIG. 11 has the characteristic as shown in FIG. 12A, that is, the delay increases from an initial value $t_0$ proportionally to the increase of $\Delta t_s$.

Thus, the read reference signal and the write reference signal delivered to the digital signal processor are delayed by the amount corresponding to the delay in the timing of the deflection due to the storage time ($t_s$) chiefly of the horizontal output transistor, and therefore, an effect is obtained that no deviation of the horizontal center is produced in the actual picture on the screen.

Below will be made description of a specific example of the delay detector 202 and the variable delay circuit 201 as the circuit blocks performing the variable delaying function in the third embodiment of the present invention.

FIG. 13 is a circuit diagram showing the aforesaid specific example, in which reference numeral 501 denotes a system clock input terminal, 503 denotes an AND gate, 504 denotes a counter, 505 denotes an integrator, 506 denotes a frequency divider, and 507 denotes an output terminal 507. Like reference numerals to those in FIG. 11 and FIG. 6 denote corresponding parts.

Operations thereof will be described below.

The delay detector 202, upon receipt of the read reference signal input to the read reference signal input terminal 301 and the flyback pulse input to the flyback pulse input terminal 302, generates a delay detecting signal in which the delay time is at High level as shown in FIGS. 14A, 14B, and 14C and outputs the signal. The delay detecting signal is input to the AND gate and used for gating the system clock input to the system clock input terminal 501. Since the system clock gated by the AND gate is output only during the period of time when the delay detecting signal is at High level, the delay time can be found by calculating number of clocks in the output. Hence, the counter 504 counts the number of clocks for every horizontal scanning period and outputs the result to the integrator 505. The integrator 505 integrates the numbers of clocks incoming at intervals of the horizontal scanning period and outputs average number of clocks. The average number of clocks is input to the frequency divider 506. The frequency divider 506 is for dividing the frequency of the system clock and providing a new read reference signal necessary for the digital signal processor. By being reset by the read reference signal, the phase of the output of the frequency divider is prevented from becoming unstable. In the reset period, the number of clocks being the delay information is taken in the frequency divider 506 as an offset, whereby the phase of the new reference signal is delayed corresponding to the number of clocks. Thus, the new read reference signal given the delay corresponding to the delay of the flyback pulse in the horizontal deflection system is obtained at the output terminal 507 and, hence, no deviation of the horizontal center is produced in the picture image.

The same effect as above can be obtained through a software program by arranging such that an algorithm corresponding to the above circuit is executed by an arithmetic unit.

If, in the specific example of the circuit blocks for variable delaying in FIG. 9, polarity and gain of the voltage amplifier 401 and others are selected so that the result of the phase comparison of the input signals agrees with the output delay time positively, the same can be applied to the delay detector 202 and the variable delay circuit 201 of the present third embodiment.

Figure 15:
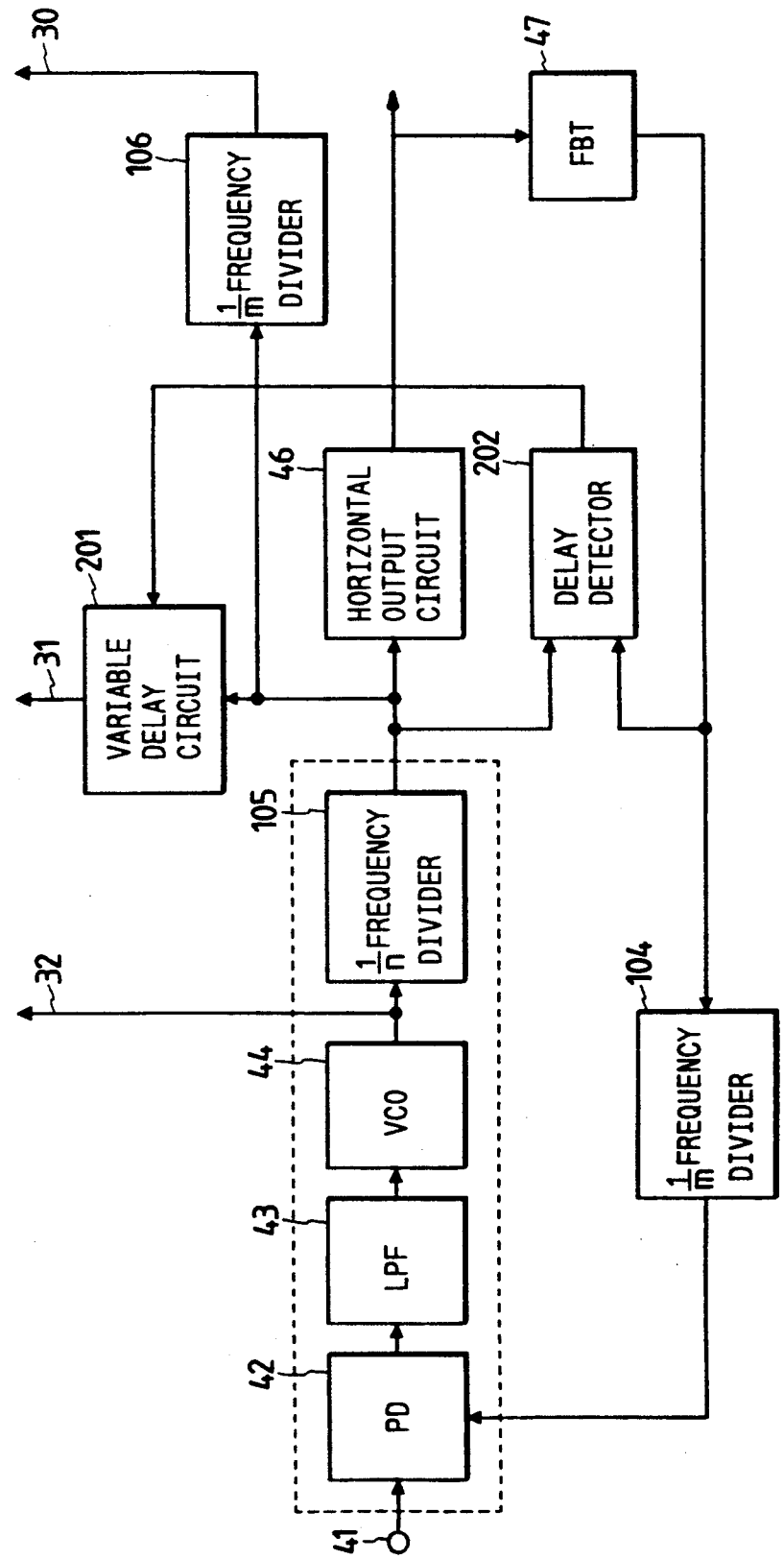
FIG. 15 is a block diagram showing a circuit configuration of a fourth embodiment of the present invention.

A fourth embodiment of the present invention will be described below with reference to FIG. 15. In FIG. 15, the parts constituting the circuit are the same as those shown in FIG. 11.

Figure 12B:
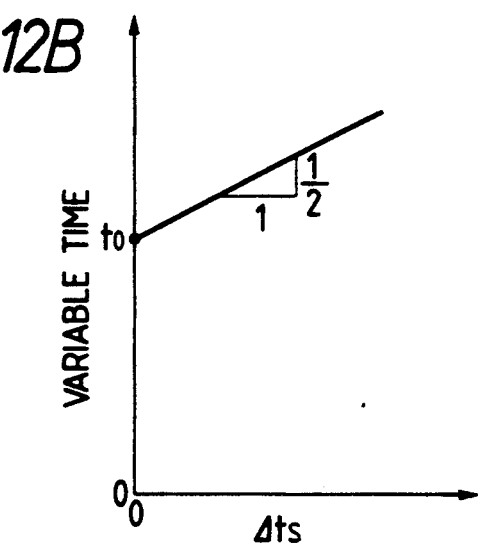

This circuit is such that the input of the 1/m frequency divider 106 in FIG. 11 is connected to the input side of the variable delay circuit 201 and, hence, only the read reference signal 31 passes through the variable delay circuit 201. The read reference signal 31 is delayed by controlling the delay amount in the variable delay circuit 201 according to the delay amount signal output of the delay detector 202. The delay control of the read reference signal 31 by the delay detector 202 and the variable delay circuit 201 in FIG. 15 has the characteristic as shown in FIG. 12B, that is, the delay is increased from an initial value $t_0$ by half the amount of $\Delta t_s$.

By the fourth embodiment is obtained the same effect as that obtained in the third embodiment.

If the output of the integrator 505 shown in the circuit of FIG. 13 is set to a half, the circuit can be applied to the present fourth embodiment.

If, in the specific example of the circuit blocks for variable delaying in FIG. 9, it is adapted such that the result of the phase comparison of the input signals agrees with half the amount of the output delay time positively, the same can be applied to the delay detector 202 and the variable delay circuit 201 of the present fourth embodiment.

Figure 16:
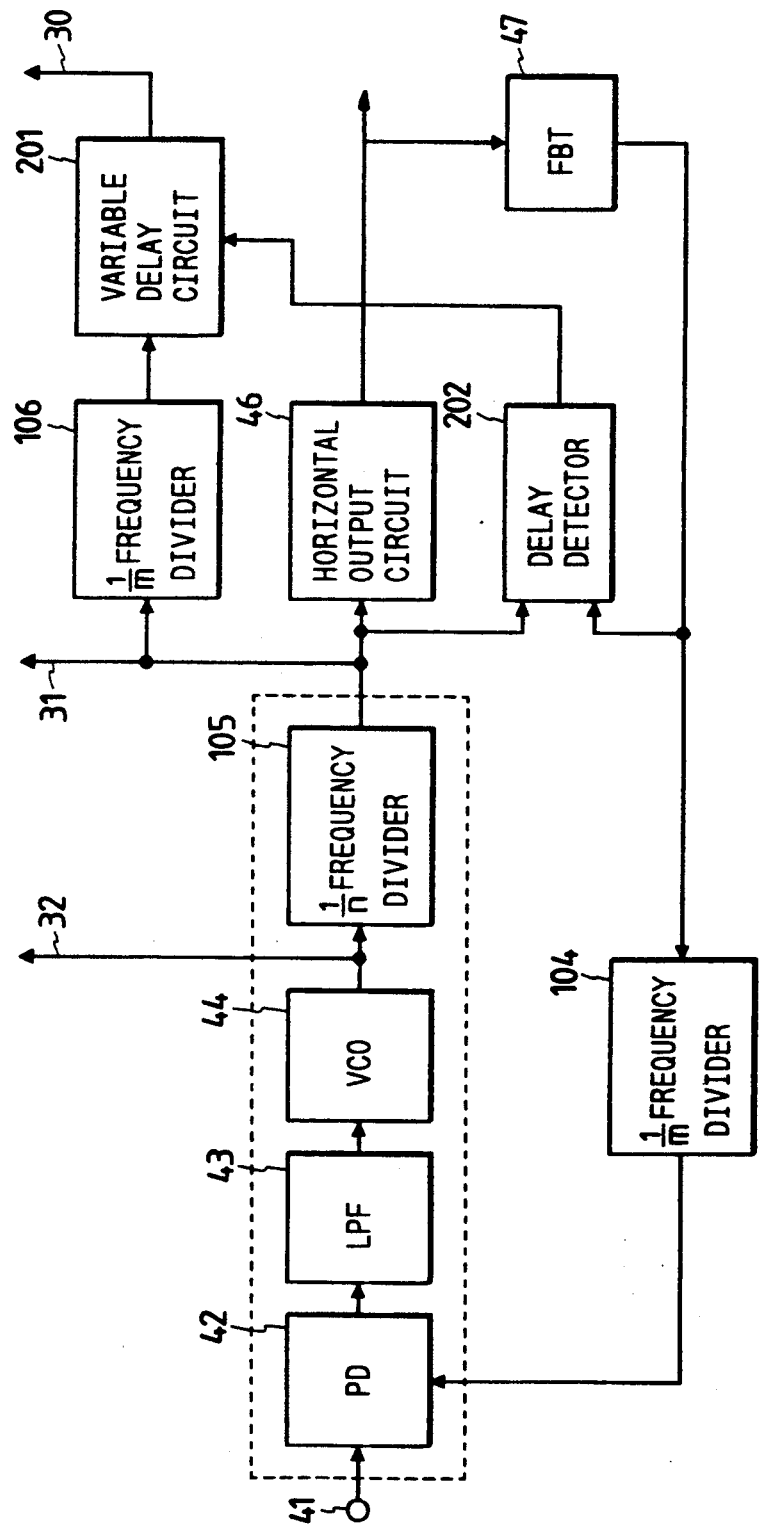
FIG. 16 is a block diagram showing a circuit configuration of a fifth embodiment of the present invention.

Now, a fifth embodiment of the present invention will be described with reference to FIG. 16. In FIG. 16, the parts constituting the circuit are the same as those shown in FIG. 11.

Figure 12C:
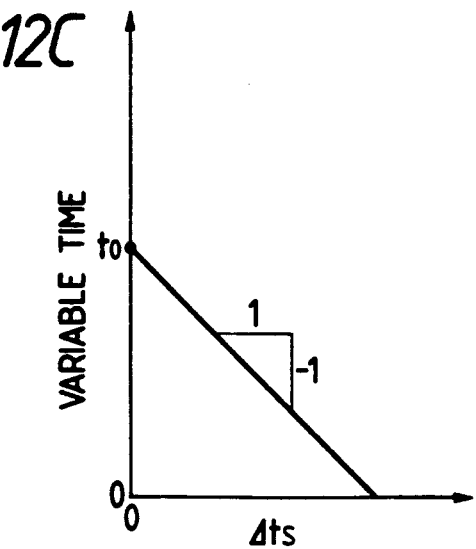

The present circuit is such that the variable delay circuit 201 in FIG. 11 is connected to the rear side of the 1/m frequency divider 106 and, hence, the write reference signal 30 passes through the variable delay circuit 201. The write reference signal 30 is delayed by the control of the delay amount in the variable delay circuit 201 according to the delay amount signal output of the delay detector 202. The delay control of the write reference signal 30 by the delay detector 202 and the variable delay circuit 201 in FIG. 16 has the characteristic as shown in FIG. 12C, that is the delay is decreased from an initial value $t_0$ by the amount of $\Delta t_s$.

According to the fifth embodiment, the same effect is obtained in the third embodiment can be obtained.

If the output of the integrator 505 in the circuit of FIG. 13 is set to be inverted, the circuit can be applied to the fifth embodiment.

If, in the specific example of the circuit blocks for variable delaying in FIG. 9, it is adapted such that the result of the phase comparison of the input signals agrees with the output delay time negatively, the same can be applied to the delay detector 202 and the variable delay circuit 201 of the present fifth embodiment.

Figure 17:
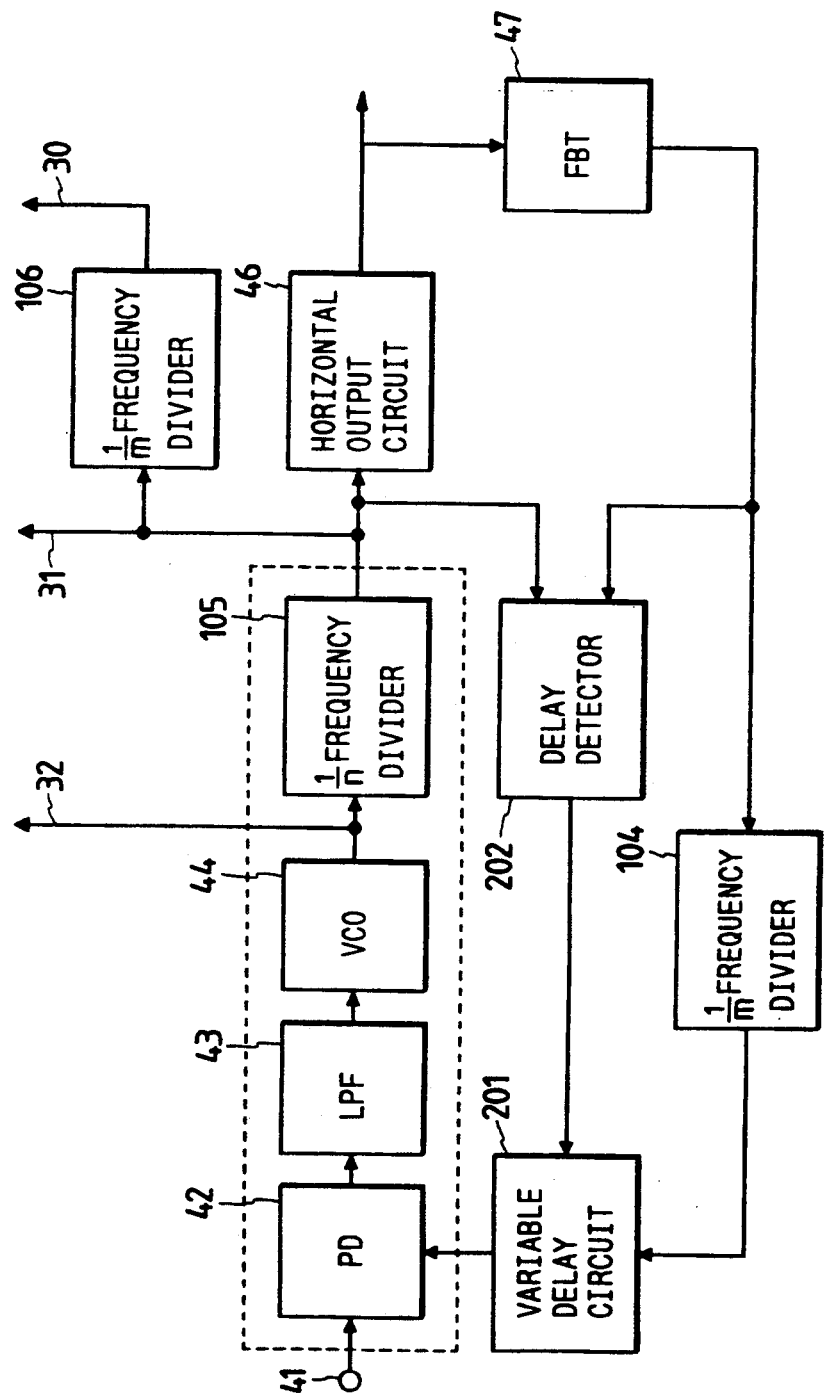
FIG. 17 is a block diagram showing a circuit configuration of a sixth embodiment of the present invention.

A sixth embodiment of the present invention will be described below with reference to FIG. 17. In FIG. 17, the parts constituting the circuit are the same as those in FIG. 11.

The present circuit is such that the variable delay circuit 201 is inserted between the 1/m frequency divider 104 and the phase comparator 42. The same as the third embodiment, the delay detector 202 detects the difference between the delay time of the horizontal drive signal as the output of the 1/n frequency divider 105 and that of the flyback pulse as the output of the flyback transformer (FBT) 47 and outputs the difference as the delay amount signal. The flyback pulse is delayed by the control of the delay amount in the variable delay circuit 201 according to the delay amount signal output from the delay detector 202. The delay control of the flyback pulse by the delay detector 202 and the variable delay circuit 201 in FIG. 17 has the characteristic as shown in FIG. 12A.

Through the above described operations, the timing of writing signal is previously delayed by the amount corresponding to the delay of the deflection chiefly due to the storage time ($t_s$) of the horizontal output transistor. Thus, an effect is obtained that there is no deviation of the horizontal center present in the picture actually displayed.

Although, in the sixth embodiment, the variable delay circuit 201 is connected at the rear side of the 1/m frequency divider 104, it may be connected in front of the 1/m frequency divider 104, with the obtainable effect kept unchanged. Further, the same effect is obtained if the outputs of the 1/m frequency divider 104 and the 1/m frequency divider 106 are used as the inputs of the delay detector 202.

The circuit shown in FIG. 13 can be applied as it is to the delay detector 202 and the variable delay circuit 201 of the present sixth embodiment.

If, in the specific example of the circuit blocks for variable delaying in FIG. 9, polarity and gain of the voltage amplifier 401 and others are selected so that the result of the phase comparison of the input signals agrees with the output delay time positively, the same can be applied to the delay detector 202 and the variable delay circuit 201 of the present sixth embodiment.

A seventh embodiment of the present invention will be described with reference to FIG. 18.

Figure 18:
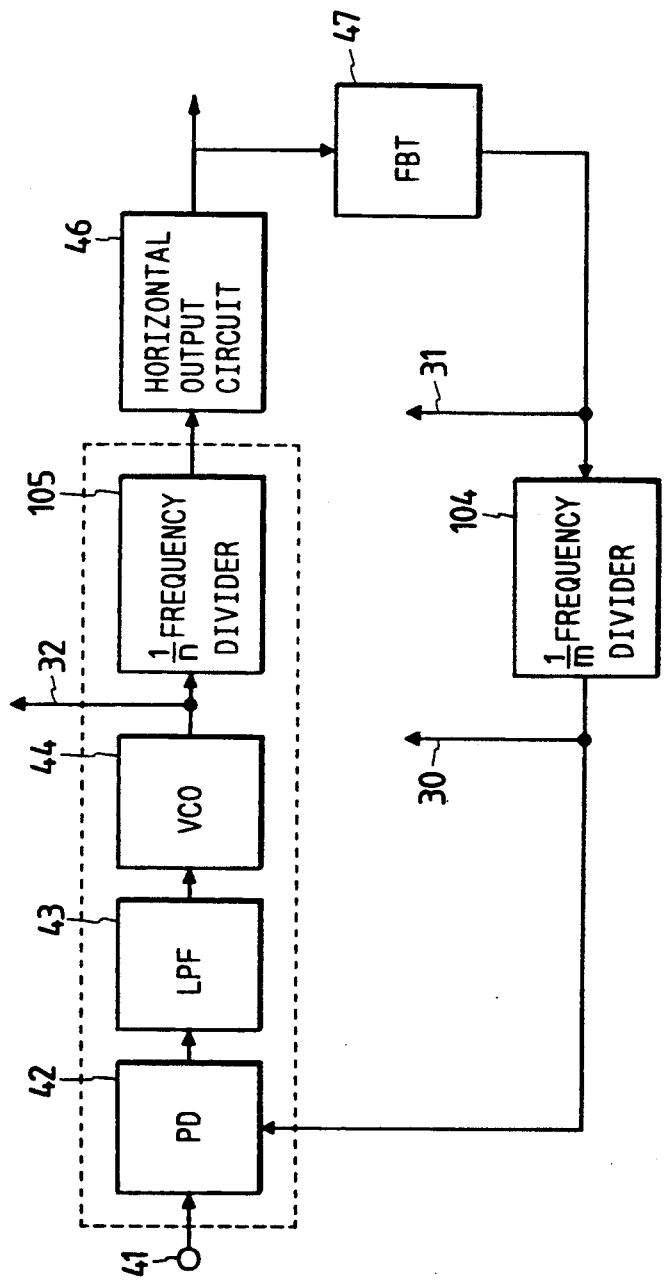
FIG. 18 is a block diagram showing a circuit configuration of a seventh embodiment of the present invention.

In FIG. 18, the flyback pulse output of the flyback transformer (FBT) 47 is used for the read reference signal 31 and the output of the 1/m frequency divider 104 is used for the write reference signal 30.

With such arrangement, since the read reference signal and write reference signal are the flyback pulse in agreement with the deflection at all times, there occurs no deviation of the horizontal center even if the storage time ($t_s$) of the horizontal output transistor varies with temperature.

As an eighth embodiment of the present invention, a bipolar transistor or a MOS-FET having a very small storage time ($t_s$) can be used for the horizontal output transistor in the television receiver of the same type as that of the present invention, and thereby, the deviation of the horizontal center can be prevented.

The above described embodiments can also provide similar effect to the above when applied to display apparatuses in general having no tuner or the like.

What is claimed is:

1. A television receiver for performing scanning for an incoming video signal at a frequency m times as high as an input horizontal synchronous frequency by controlling a signal for writing and a signal for reading of a video signal memory unit, comprising a horizontal synchronization/deflection circuit for generating a signal to control the signal for writing and the signal for reading of said video memory unit, said horizontal synchronization/deflection circuit including means for automatically controlling the horizontal position of a picture image displayed on the screen of said television receiver to a predetermined position on the screen, wherein m is an integer.

2. A television receiver according to claim 1, wherein said horizontal synchronization/deflection circuit includes:

a horizontal output circuit for transmitting a horizontal drive signal to a horizontal deflection yoke;

a flyback transformer for amplifying the horizontal drive signal; and means for bringing the horizontal drive signal and the reading signal in phase with one another.

3. A television receiver according to claim 2, wherein said control means in said horizontal synchronization/deflection circuit for bringing the horizontal drive signal and the read signal in phase is means for comparing the phase of the horizontal drive signal with the phase of a flyback pulse generated by said flyback transformer thereby controlling the write signal and/or the read signal or the flyback pulse according to the result of the phase comparison.

4. A television receiver according to claim 3, wherein said horizontal synchronization/deflection circuit includes:

frequency control means having a phase comparator for comparing the phase of the input horizontal sync signal with the phase of the output of a second 1/m frequency divider, a low-pass filter for allowing to pass a necessary band of the output of said phase comparator, a voltage-controlled oscillator capable of varying its oscillating frequency in response to the output of said low-pass filter, a 1/n frequency divider for dividing the frequency of the output of said voltage-controlled oscillator into a suitable frequency thereby generating the horizontal drive signal for achieving scanning at a frequency m times as high as the input horizontal synchronous frequency and the read reference signal, a variable delay circuit for varying the delay time of the read reference signal output of said 1/n frequency divider, a first 1/m frequency divider for dividing the frequency of the output of said variable delay conduit thereby generating the write reference signal, a horizontal output circuit for driving the horizontal deflection system with the horizontal drive signal output of said 1/n frequency divider, a flyback transformer for generating a high voltage from the output of said horizontal output circuit, a delay detector for detecting the difference between the delay time of the output of said flyback transformer and that of the output of said 1/n frequency divider, and said second 1/m frequency divider for dividing the frequency of the output of said flyback transformer and supplying the output with its frequency divided to said phase comparator, for controlling the oscillating frequency of said voltage-controlled oscillator with the output of said phase comparator such that the phase difference between the input horizontal sync signal and the output of said second 1/m frequency divider is kept constant at all times; and delay control means for controlling the delay time in said variable delay circuit according to the output of said delay detector wherein n is an integer.

5. A television receiver according to claim 3, wherein said horizontal synchronization/deflection circuit includes:

frequency control means having a phase comparator for comparing the phase of the input horizontal sync signal with the phase of the output of a second 1/m frequency divider, a low-pass filter for allowing to pass a necessary band of the output of said phase comparator, a voltage-controlled oscillator capable of varying its oscillating frequency in response to the output of said low-pass filter, a 1/n frequency divider for dividing the frequency of the output of said voltage-controlled oscillator into a suitable frequency thereby generating the horizontal drive signal for achieving scanning at a frequency m times as high as the input horizontal synchronous frequency and the read reference signal, a variable delay circuit for varying the delay time of the read reference signal output of said 1/n frequency divider, a first 1/m frequency divider for dividing the frequency of the read reference signal output of said 1/n frequency divider thereby generating the write reference signal, a horizontal output circuit for driving the horizontal deflection system with the horizontal drive signal output of said 1/n frequency divider, a flyback transformer for generating a high voltage from the output of said horizontal output circuit, a delay detector for detecting the difference between the delay time of the output of said flyback transformer and that of the output of said 1/n frequency divider, and said second 1/m frequency divider for dividing the frequency of the output of said flyback transformer and supplying the output with its frequency divided to said phase comparator, for controlling the oscillating frequency of said voltage-controlled oscillator with the output of said phase comparator such that the phase difference between the input horizontal sync signal and the output of said second 1/m frequency divider is kept constant at all times; and delay control means for controlling the delay time in said variable delay circuit according to the output of said delay detector.

6. A television receiver according to claim 3, wherein said horizontal synchronization/deflection circuit includes:

frequency control means having a phase comparator for comparing the phase of the input horizontal sync signal with the phase of the output of a second 1/m frequency divider, a low-pass filter for allowing to pass a necessary band of the output of said phase comparator, a voltage-controlled oscillator capable of varying its oscillating frequency in response to the output of said low-pass filter, a 1/n frequency divider for dividing the frequency of the output of said voltage-controlled oscillator into a suitable frequency thereby generating the horizontal drive signal for achieving scanning at a frequency m times as high as the input horizontal synchronous frequency and the read reference signal, a first 1/m frequency divider for dividing the frequency of the read reference signal output of said 1/n frequency divider thereby generating the write reference signal, a variable delay circuit for varying the delay time of the write reference signal output of said first 1/m frequency divider, a horizontal output circuit for driving the horizontal deflection system with the horizontal drive signal output of said 1/n frequency divider, a flyback transformer for generating a high voltage from the output of said horizontal output circuit, a delay detector for detecting the difference between the delay time of the output of said flyback transformer and that of the output of said 1/n frequency divider, and said second 1/m frequency divider for dividing the frequency of the output of said flyback transformer and supplying the output with its frequency divided to said phase comparator, for controlling the oscillating frequency of said voltage-controlled oscillator with the output of said phase comparator such that the phase difference between the input horizontal sync signal and the output of said second 1/m frequency divider is kept constant at all times; and delay control means for controlling the delay time in said variable delay circuit according to the output of said delay detector.

7. A television receiver according to claim 3, wherein said horizontal synchronization/deflection circuit includes:

frequency control means having a phase comparator for comparing the phase of the input horizontal sync signal with the phase of the output of a variable delay circuit, a low-pass filter for allowing to pass a necessary band of the output of said phase comparator, a voltage-controlled oscillator capable of varying its oscillating frequency in response to the output of said low-pass filter, a 1/n frequency divider for dividing the frequency of the output of said voltage-controlled oscillator into a suitable frequency thereby generating the horizontal drive signal for achieving scanning at a frequency m times as high as the input horizontal synchronous frequency and the read reference signal, a first 1/m frequency divider for dividing the frequency of the read reference signal output of said 1/n frequency divider thereby generating the write reference signal, a horizontal output circuit for driving the horizontal deflection system with the horizontal drive signal output of said 1/n frequency divider, a flyback transformer for generating a high voltage from the output of said horizontal output circuit, a delay detector for detecting the difference between the delay time of the output of said flyback transformer and that of the output of said 1/n frequency divider, a second 1/m frequency divider for dividing the frequency of the output of said flyback transformer, and said variable delay circuit capable of varying the delay time of the output of said second 1/m frequency divider, for controlling the oscillating frequency of said voltage-controlled oscillator with the output of said phase comparator such that the phase difference between the input horizontal sync signal and the output of said variable delay circuit is kept constant at all times; and delay control means for controlling the delay time in said variable delay circuit according to the output of said delay detector wherein n is an integer.

8. A television receiver according to any one of claims 4 to 7, wherein said variable delay circuit includes a pulse width varying circuit, which is constituted of a variable current source and a monostable multivibrator, and a waveform shaping circuit for shaping the waveform of the output of said pulse width varying circuit.

9. A television receiver according to any one of claims 3 to 7, wherein said variable delay circuit includes an AND gate performing logical product operation on the output of said delay detector and the system clock, a counter for counting the output of said AND gate for every horizontal scanning period, an integrator for integrating the output of said counter, and a frequency divider capable of shifting the offset value with the output of said integrator.

10. A television receiver according to claim 9, wherein said counter and integrator are arithmetic means performing operations using arithmetic units.

11. A television receiver according to claim 7, wherein said variable delay circuit is disposed in front of said second 1/m frequency divider.

12. A television receiver according to claim 7, wherein the input of said delay detector is connected with the output of said first 1/m frequency divider and the output of said second 1/m frequency divider.

13. A television receiver according to claim 2, wherein m is an integer of at least two.

14. A television receiver according to claim 1, wherein said controlling means comprises:

a phase comparator for comparing a phase of a horizontal drive signal and a phase of a signal output from a flyback transformer; and a variable delay circuit responsive to an output of said phase comparator for controlling the phase of a signal to be input to a horizontal output circuit.

15. A television receiver according to claim 14, wherein said horizontal synchronization/deflection circuit includes:

frequency control means having a first phase comparator for comparing the phase of the input horizontal sync signal with the phase of the output of said flyback transformer, a first low-pass filter for allowing to pass a necessary band of the output of said first phase comparator, a voltage-controlled oscillator capable of varying its oscillating frequency in response to the output of said first low-pass filter, a 1/n frequency divider for dividing the frequency of the output of said voltage-controlled oscillator into a suitable frequency thereby generating the horizontal drive signal for achieving scanning at a frequency m times as high as the input horizontal synchronous frequency and the read reference signal, a first 1/m frequency divider for dividing the frequency of the read reference signal output from said 1/n frequency divider thereby generating the write reference signal, a variable delay circuit for varying the delay time of the horizontal drive signal output of said 1/n frequency divider, a horizontal output circuit for driving the horizontal deflection system with the output of said variable delay circuit, a flyback transformer for generating a high voltage from the output of said horizontal output circuit, a second 1/m frequency divider for dividing the frequency of the output of said flyback transformer and supplying the output with its frequency divided to said first phase comparator, a second phase comparator for comparing the phase of the output of said 1/n frequency divider with the phase of the output of said flyback transformer, and a second low-pass filter for allowing to pass a necessary band of the output of said second phase comparator, for controlling the oscillating frequency of said voltage-controlled oscillator with the output of said first phase comparator such that the phase difference between the input horizontal sync signal and the output of said second 1/m frequency divider is kept constant at all times; and delay control means for controlling the delay time in said variable delay circuit with the output of said second phase comparator such that the phase difference between the output of said 1/n frequency divider and output of said flyback transformer is kept constant at all times.

16. A television receiver according to claim 14, wherein said horizontal synchronization/deflection circuit includes:

frequency control means having a first phase comparator for comparing the phase of the first horizontal sync signal with a phase of the output of a 1/m frequency divider, a first low-pass filter for allowing to pass a necessary band of the output of said first phase comparator, a voltage-controlled oscillator capable of varying its oscillating frequency in response to the output of said first low-pass filter, a 1/n frequency divider for dividing the frequency of the output of said voltage-controlled oscillator into a frequency for providing the reading signal and for enabling generation of the horizontal drive signal for achieving scanning at a frequency m times as high as the first input horizontal synchronous frequency, another 1/m frequency divider for dividing the frequency of the reading signal from said 1/n frequency divider thereby generating the writing signal, a variable delay circuit for varying the delay time of the horizontal drive signal output of said 1/n frequency divider, a horizontal output circuit for driving the horizontal deflection system with the output of said variable delay circuit, a flyback transformer for generating a high voltage from the output of said horizontal output circuit, a second phase comparator for comparing the phase of the output of said flyback transformer with the phase of the output of said 1/n frequency divider, a second low-pass filter for allowing to pass a necessary band of the output of said second phase comparator, and said 1/m frequency divider for dividing the frequency of the output of said 1/n frequency divider and supplying the output with its frequency divided to said first phase comparator, for controlling the oscillating frequency of said voltage-controlled oscillator with the output of said first phase comparator such that the phase difference between the first horizontal sync signal and the output of said 1/m frequency divider is kept constant at all times;

wherein n is an integer.

17. A television receiver according to any one of claims 14 to 16, wherein said variable delay circuit includes a pulse width varying circuit, constituted of a variable current source and a monostable multivibrator, and a waveform shaping circuit for shaping the waveform of the output of said pulse width varying circuit.

18. A television receiver according to claim 1, wherein said horizontal synchronization/deflection circuit includes a flyback transformer providing an output signal for utilization as one of the reading signal and the writing signal for the video signal memory unit.

19. A television receiver according to claim 18, wherein said horizontal synchronization/deflection circuit includes:

frequency control means having a phase comparator for comparing the phase of the input horizontal sync signal with the phase of the output of a 1/m frequency divider, a low-pass filter for allowing to pass a necessary band of the output of said phase comparator, a voltage-controlled oscillator capable of varying its oscillating frequency in response to the output of said low-pass filter, a 1/n frequency divider for dividing the frequency of the output of said voltage-controlled oscillator into a suitable frequency thereby generating the horizontal drive signal for achieving scanning at a frequency m times as high as the input horizontal synchronous frequency, a horizontal output circuit for driving the horizontal deflection system with the horizontal drive signal output of said 1/n frequency divider, a flyback transformer for generating a high voltage from the output of said horizontal output circuit, and said 1/m frequency divider for dividing the frequency of the output of said flyback transformer, for controlling the oscillating frequency of said voltage-controlled oscillator with the output of said phase comparator such that the phase difference between the input horizontal sync signal and the output of said 1/m frequency divider is kept constant at all times;

first generating means for generating the write reference signal from the output of said 1/m frequency divider; and second generating means for generating the read reference signal from the output of said flyback transformer wherein n is an integer.

20. A television receiver according to claim 1, wherein said controlling means comprises:

means for receiving a horizontal sync signal thereby generating a signal with a frequency m times as high as that of the horizontal sync signal;

a horizontal output circuit for receiving the signal with the m-fold frequency and transmitting a horizontal drive signal to a horizontal deflection yoke;

a flyback transformer for amplifying the signal with the m-fold frequency;

a phase comparator for comparing the phase of the signal output from said flyback transformer and the signal with the m-fold frequency; and a variable delay circuit for controlling the phase of the signal with the m-fold frequency according to the output of said phase comparator, 21. A television receiver according to claim 1, wherein said controlling means comprises:

means for receiving a horizontal sync signal thereby generating a signal with a frequency m times as high as that of the horizontal sync signal;

a horizontal output circuit for receiving the signal with the m-fold frequency and transmitting a horizontal drive signal to a horizontal deflection yoke;

a flyback transformer for amplifying the signal with the m-fold frequency; and means for comparing the phase of the signal with the m-fold frequency and that of a flyback pulse generated by said flyback transformer and for controlling, according to the result of the comparison, at least one of the writing signal, the reading signal and the flyback pulse.

22. A television receiver according to claim 1, wherein said means for performing control whereby the horizontal position of a picture image displayed on the screen of said television receiver is brought to a predetermined position comprises:

means for receiving a horizontal sync signal thereby generating a signal with a frequency n times as high as that of the horizontal sync signal;

a horizontal output circuit for receiving the signal with the n-fold frequency and transmitting a horizontal drive signal to the horizontal deflection yoke; and a flyback transformer for amplifying the signal with the n-fold frequency; and is further provided with a circuit for controlling the write signal and/or the read signal with the flyback pulse output from said flyback transformer wherein n is an integer.

* * * * *